(12) United States Patent
Payne

(10) Patent No.: US 7,386,500 B1
(45) Date of Patent: Jun. 10, 2008

(54) COMPUTER BASED SYSTEM FOR VALUING AND HEDGING CUSTOMIZED INDEXED CALL OPTION

(75) Inventor: Richard C. Payne, Mississauga (CA)

(73) Assignee: Genesis Financial Products, Inc., Toronto (CA)

( * ) Notice: Subject to any disclaimer, the term of this patent is extended or adjusted under 35 U.S.C. 154(b) by 1151 days.

(21) Appl. No.: 09/893,633

(22) Filed: Jun. 27, 2001

(51) Int. Cl.
*G06Q 40/00* (2006.01)
(52) U.S. Cl. .............................. 705/37; 705/36; 705/35; 705/5; 705/26
(58) Field of Classification Search .................. 705/37, 705/38, 34, 1, 36, 36 R, 35, 4; 706/36
See application file for complete search history.

(56) References Cited

U.S. PATENT DOCUMENTS

| 5,220,501 A * | 6/1993 | Lawlor et al. ................. 705/40 |
| 5,920,847 A * | 7/1999 | Kolling et al. ................. 705/40 |
| 6,252,869 B1 * | 6/2001 | Silverman .................... 370/352 |
| 7,024,384 B2 * | 4/2006 | Daughtery, III ........... 705/36 R |
| 2002/0099640 A1 * | 7/2002 | Lange ......................... 705/37 |

OTHER PUBLICATIONS

Insurance investment performance: The need for total return Huang, Susan S, King, Donald A. Journal of the American Society of CLU & ChFC. Bryn Mawr: May 1995. vol. 49, Iss. 3; p. 86, 5 pgs.*

* cited by examiner

*Primary Examiner*—Frantzy Poinvil
*Assistant Examiner*—Clement Graham
(74) *Attorney, Agent, or Firm*—Simpson & Simpson, PLLC

(57) ABSTRACT

A computer-based system for valuing a customized indexed call option.

10 Claims, No Drawings

COMPUTER BASED SYSTEM FOR VALUING AND HEDGING CUSTOMIZED INDEXED CALL OPTION

FIELD OF THE INVENTION

The present invention relates generally to financial products, more specifically to computer-based systems for pricing and valuing financial products, and, even more particularly, to computer-based systems for valuing a customized indexed call option.

REFERENCE TO COMPUTER PROGRAM LISTING APPENDIX

The present application includes a computer program listing appendix on compact disc. Two duplicate compact discs are provided herewith. Each compact disc contains ASCII text files on a Windows based operating system of the computer program listing as follows:

Total Size: 101 KB

Date Created Jun. 22, 2001

The computer program listing appendix is hereby expressly incorporated by reference in the present application.

BACKGROUND OF THE INVENTION

A call option is a financial instrument that gives its holder the right (but not the obligation) to purchase a given security at a pre-specified price, called the strike price or exercise price, from the option seller. This structure allows the option holder to profit if the price of the security exceeds the strike price at the time of expiry of the option. At the same time, the maximum possible loss to the holder is limited to the price paid for the option if the security is worth less than the exercise price, since the holder is not forced to buy the security at an above-market price.

Options usually have a limited lifespan (the term) and have two main styles of exercise, American and European. In an American-exercise call option, the security may be purchased for its strike price at any time during the term. In a European-exercise call option, in contrast, the security may only be purchased at the end of the term.

An indexed call option is one in which the role of "securities price" is played by an index, often an equity index such as the S&P 500 or the Nasdaq 100. Since delivering the basket of securities that compose the index is usually impractical, indexed call options are usually cash-settled. This means that if the index is greater than the strike price at time of exercise, the option seller pays the option holder the difference in price in cash: if the index is less than or equal to the strike, no payment is made.

Many investors currently purchase indexed call options directly to help achieve a desired balance of risk and return in their investment portfolios. Many consumers also benefit indirectly from investments in such options when they buy indexed deposit products such as equity-indexed annuities or indexed certificates of deposit (CD's). This is because indexed deposit products are usually constructed from a mixture of fixed-income instruments such as bonds or mortgages and indexed call options.

Investors and consumers obtain many benefits through the use of indexed call options, such as:

The ability to benefit from increases in the index while limiting the maximum loss to the price paid for the option;

Achievement of diversification by linking investment returns to an index aggregating the performance of multiple issuers, rather than just one security; and Through indexed deposit products, achievement of a guaranteed return of principal together with investment returns linked to an index.

There are also some disadvantages associated with investment in indexed call options, including the following:

Inability to take advantage of changes in economic circumstances, because returns are tied to one index for the term of the option; and Inability to "take shelter during a storm"—i.e. to link option returns to a safe alternative such as a credited interest rate during times of great perceived risk of index declines, and to resume index linkage as prospects improve.

Additionally, because the price of a call option increases less than linearly in the length of the term, the highest participation in increases in the index (per dollar of option premium) can usually be achieved by picking the longest option term available. This unfortunately makes it even harder for the option holder to take advantage of changes in economic circumstances.

The investor or consumer therefore must face the situation that shorter-term options provide greater flexibility but are more expensive, while longer-term options provide greater potential return but are less flexible. A difficult choice must be made.

Accordingly, there is a long-felt need for an indexed call option structure permitting the purchaser to achieve the benefits associated with longer terms, while providing the greater flexibility characteristic of shorter terms. There is correspondingly a long-felt need for a computer-based system for valuing such an indexed call option structure.

SUMMARY OF THE INVENTION

The present invention generally comprises computer-based method for determining a value of a customized indexed call option, including the steps of searching a data structure based on a search criterion to determine at least one intermediate value of the customized indexed call option, and, interpolating in the at least one intermediate value of the customized indexed call option based on a set of predetermined parameters of the customized indexed call option to find the value.

DETAILED DESCRIPTION OF THE PREFERRED EMBODIMENT

Mathematical Definition of the Problem to be Solved

A brief informal description of a customized indexed call option is one that provides the holder with the ability to change the index linkage of the option at predefined intervals during the option's term.

Formally, we define a customized indexed call option on $K \geq 1$ indices, where K is an integer, as follows:

A call option having a specified term T and notional amount N allowing the option holder to choose notional amounts $N^i$, where i is an integer such that $0 \leq i \leq K$, at specified intervals within the term such that $\Sigma N^i \leq N$ and $\forall i\ N^i \geq 0$, where the return on the notional amount $N^0$ is based upon an arbitrary but specified interest rate (the constant growth rate), the return on the notional amount $N^i$ is based on changes in specified index i, and the total return over the term is guaranteed to be nonnegative.

The value of a customized indexed call option in the limiting case in which choices can be made continuously and the indices are uncorrelated can be found by solving the optimal stochastic control problem:

Find $q^i(S,X,t)$ such that $\Sigma q^i(S,X,t) \in [0,1]$ for all S, X, and t, where i is an integer such that $1 \leq i \leq K$, maximizing the mathematical expectation of $\max(X_T-1,0)$, where $X_0=1$ and $X_t$ evolves according to the following stochastic differential equation (SDE):

$$dX_t = g(1-\Sigma q^i(S_t,X_t,t))X_t dt + \Sigma P^i q^i(S_t,X_t,t)((r-d^i-y^i)S^i_t dt + \sigma^i S^i_t dW^i)$$

in which summations are over the index i and the functions and variables have the following meaning:

$S^i_t$ is the value of index i at time t, $X_t$ is a state variable reflecting the composite of changes in the indices up to time t (during periods in which the option was linked to an index) and past credits at the constant growth rate (during periods in which the option was linked to the constant growth rate), $q^i(S,X,t)$ is the optimal amount of linkage to index i for the option holder to pursue to maximize the mathematical expectation of $X_T$, the value of X at the end of the option term, based on the entire collection of indices $S^i$ at time t, the value of X at time t, and t, g is the (continuously-compounded) constant growth rate, $P^i$ is the participation rate for index i, r is the (continuously-compounded) risk-free rate, $d^i$ is the (continuously-compounded) dividend rate on the securities making up index i, $y^i$ is the yield spread for index i, $\sigma^i$ is the volatility of index i, dt is an infinitesimal time increment, and $dW^i$ is an infinitesimal increment of a standard Wiener process for each i.

Extending the equation to handle the case of correlated indices requires introduction of the correlation matrix $\rho^{ij}$ in the Wiener process term.

Once this equation has been solved for $X_0=1$ the solution for any desired notional amount can be obtained by scaling by the notional amount. The discrete-time problem, in which choices may only be made at specified finite intervals, can be solved analogously.

The optimal linkage to index i function, $q^i(S,X,t)$, for the option holder will depend on the then-current values of X, S, and t, as well as the values of r, d, y, g, and $\sigma$ for which the problem has been solved. In general, if X is high relative to all of the $S^i$'s, or for a high value of g, the option holder will maximize the expected option payoff by picking the constant growth rate linkage. If those conditions are not true then the expected option payoff will be maximized by linking to one of the indices, the optimum one depending on the relative magnitudes and volatilities of the indices.

The optimal linkage strategy leads to more complex patterns of optimal option-holder behavior than are typical of, for example, an American-exercise option. Rather than making a single decision to exercise early (as would occur in an American-exercise put or call), the option-holder may rationally switch back and forth between linkage to one of the indices, linkage to the constant growth rate, and linkage to another of the indices many times as S and X vary and t progresses.

Having defined a customized indexed call option, we can define customized indexed deposit products, such as deferred annuities, life insurance, certificates of deposit, and bonds. Such products are composed of a fixed income component guaranteeing principal and a customized indexed call option providing returns varying with the movement of the indices and the selections made by the depositor.

The customized indexed call option has some features in common with option structures that have previously been described in the literature (such as passport options and vacation calls). However, there are important differences which lead to better integration with deposit products and lower option costs. These differences include the absence of interest charges for taking a long position in the index (unlike the passport option), the ability for the option seller to set the guaranteed rate g according to their perception of achievable returns on fixed income instruments and market demand (unlike the vacation call), and the ability to pick between multiple indices.

Solution Methods

Defining the problem to be solved is much simpler than finding an efficient numerical solution method. We describe three alternative solution methods below: the most efficient solution method depends on whether the number of indices K is one or greater than one. The term "Bellman equation" is used throughout as an abbreviation for "Hamilton-Jacobi-Bellman equation".

Solution Method One

The most conceptually straightforward solution method is to formulate and solve the Bellman equation via a recursive procedure together with the boundary condition that the value of the option at expiry is fully determined by the value of the state variable X.

For the case in which the available selections are two independent indices and the constant growth rate, the yield spread y is zero, and the participation rate is 100%, then the value of the option at time t can be expressed as a function of the values at time $t+\Delta t$ as follows:

$$V(S^1,S^2,X,t) = c^* \max(v0,v1,v2),$$

where $$v0 = q^1 q^2 V(S^1 d^1, S^2 d^2, kX, t+\Delta t) + q^1 p^2 V(S^1 d^1, S^2 u^2, kX, t+\Delta t) + p^1 q^2 V(S^1 u^1, S^2 d^2, kX, t+\Delta t) + p^1 p^2 V(S^1 u^1, S^2 u^2, kX, t+\Delta t),$$

$$v1 = q^1 q^2 V(S^1 d^1, S^2 d^2, X+S^{1*}(d^1-1), t+\Delta t) + q^1 p^2 V(S^1 d^1, S^2 u^2, X+S^{1*}(d^1-1), t+\Delta t) + p^1 q^2 V(S^1 u^1, S^2 d^2, X+S^{1*}(u^1-1), t+\Delta t) + p^1 p^2 V(S^1 u^1, S^2 u^2, X+S^{1*}(u^1-1), t+\Delta t),$$

and $$v2 = q^1 q^2 V(S^1 d^1, S^2 d^2, X+S^{2*}(d^2-1), t+\Delta t) + q^1 p^2 V(S^1 d^1, S^2 u^2, X+S^{2*}(u^2-1), t+\Delta t) + p^1 q^2 V(S^1 u^1, S^2 d^2, X+S^{2*}(d^2-1), t+\Delta t) + p^1 p^2 V(S^1 u^1, S^2 u^2, X+S^{2*}(u^2-1), t+\Delta t)$$

where the variables are as follows:

c is the discount factor over the interval $\Delta t$;

$p^i$ is the risk-neutral probability of an up move in index i over the interval $\Delta t$;

$q^i$ is the risk-neutral probability of a down move in index i over the interval $\Delta t$;

$u^i$ is the multiplier for index i for up moves, i.e. $S^i_t$ goes to $S^i_{t+\Delta t} = S^i_t * u^i$;

$d^i$ is the multiplier for index i for down moves, i.e. $S^i_t$ goes to $S^i_{t+\Delta t} = S^i_t * d^i$; and k is the constant growth rate factor over the interval $\Delta t$, i.e. $e^{g\Delta t}$;

See *An Introduction to the Mathematics of Financial Derivatives*, Salih N. Neftci, for a lucid account of risk-neutral probabilities and how they differ from physical probabilities, and Options, Futures, and Other Derivative Securities, John Hull for a discussion of how to calculate p, q, u, and d in the context of valuing a European- or American-exercise call option on a single index.

This recursive procedure is reminiscent of the recursive evaluation of the tree of values of game positions used in computer programs for playing chess or backgammon. The crucial difference is that the game is against nature rather than against an opponent, so the possibilities are combined according to the maximum given a specified probability distribution rather than according to a minimax criterion.

Once values have been obtained for two sets of timesteps until expiry (e.g. $\Delta t=T/6$ and $\Delta t=T/12$) then more accurate values can be obtained by Richardson extrapolation as described below.

Unfortunately, this method is extremely inefficient because the number of steps grows exponentially in the number of timesteps until expiry. This can be easily seen in the case described above because each value determined at time t requires determination of twelve values at time $t+\Delta t$, so that increasing the number of steps from inception to expiry by one increases the number of function calls by a factor of twelve. This exponential growth quickly gets out of hand: $\Delta t=T/12$ requires on the order of nine trillion recursive function calls.

Therefore, a different method of solving the Bellman equation is required for a practical implementation that can be used to price and hedge option values on a timescale that is consistent with that required by the financial markets.

Solution Method Two

The critical problem with the recursive formulation in solution method 1 was not with the S argument to the V function (since p, q, u, and d are determined so that the index values form a recombining lattice) but with the X argument, where no such recombination takes place. Since it is clear that V is continuous in the X argument, it might be possible to interpolate on it.

Therefore, it seems reasonable to believe that:

a lattice of index prices S, together with a vector of state variables X at each lattice point, together with an interpolation method for calculating v0, v1, and v2 in the Bellman recursion above, could provide a solution method. Although there are some complexities to be worked through before achieving an efficient and numerically stable method, this is the essence of the solution method used in the program for the single-index case.

However, this method rapidly becomes unworkable for two or more indices because the amount of RAM required grows exponentially in the number of indices. Colloquially, the intractability of multi-dimensional problems was first called "the curse of dimensionality", by Richard Bellman, and the name has stuck.

Solution Method Three

Monte Carlo simulation is a well-known general method of developing approximate solutions for many problems subject to the curse of dimensionality. This particular problem cannot easily be solved by Monte Carlo methods alone, however, because the maximum value of $X_T$ depends on the index linkage strategy functions $q^i(S,X,t)$ which are not known in advance.

However, it seems reasonable to believe that a combination of the following elements:

Monte Carlo simulation of the indices $S^i$, and hence of $X_T$ given an assumed functional form for the index linkage strategy functions $q^i(S,X,t)$;

Suitable parameterization of the index linkage strategy functions $q^i(S,X,t)$; and Nonlinear optimization of the parameters for the $q^i(S,X,t)$ to improve the strategies, and hence improve $X_T$;

could provide a solution method, and this turns out to be the case. The most difficult part is finding a "suitable parameterization" to represent the $q^i(S,X,t)$: some experimentation with solution method two in the single index case, and with assumed functional forms for the $q^i(S,X,t)$ was required. An important implementation consideration is that the efficiency of the nonlinear optimization can be improved by randomizing the initial condition in the Monte Carlo simulation—this can be viewed as an importance sampling technique.

It should be appreciated that the Monte Carlo simulation could be performed using quasi-random numbers (e.g. the Sobol' sequence) rather than pseudo-random numbers to generate the index paths.

Purpose and Structure of the Program

Given a set of financial market parameters, option parameters, and simulation parameters, the program creates a data structure allowing the user to calculate prices and hedging parameters ("Greeks") for customized index call options with specified times to expiry.

Although the description focuses on call options, it should be obvious to one skilled in the art how to modify the program to value put options instead. Similarly, although indices are referred to throughout, options based on single values rather than an index of values (e.g., on the prices of single securities, such as IBM and Intel common shares, rather than indices based on an aggregate of securities prices, such as the S&P 500 and the Nasdaq 100) can clearly be handled without making any program changes.

The program treats the single-index and multiple-index cases separately in order to minimize execution time. We therefore describe the single-index and multiple-index parts of the program separately.

Initialization Phase (Single Index)

The initialization phase formulates and solves the Bellman equation on a data structure which can be described as a lattice of vectors. Each lattice is characteristic of a range of possible index values and has up- and down-move magnitudes selected so that the lattice is recombining—after 100 timesteps there are only 101 possible index values, not $2^{100}$ as would occur with a non-recombining tree.

Backward induction through the lattice is performed starting at epoch T, the expiry time of the customized indexed call option, doing all the vectors at epoch t before doing any vectors at epoch t−1. This approach ensures that option values are computed in the order required, i.e. that values are defined before being used.

The Bellman recursion described above is used, with quadratic stencil interpolation on the state variable X argument as described below, with two different spacings on X. Richardson extrapolation is used to combine the values at the two different X spacings into a single, more accurate value which is stored but does not enter the calculation at the next earlier epoch.

The timestep for recording the solution is larger than the timestep for computing the solution (i.e. not all values are saved). This approach is necessary to keep RAM usage reasonable while achieving accurate option values at the lattice/vector points.

Option Valuation Phase (Single Index)

Once the lattice of vectors has been initialized, option values can be obtained for values of S, X, and t that are exactly matched by some lattice/vector point. In general, the values of S, X, and t for which an option value is required will not exactly match a lattice/vector point, and so one or more interpolation steps are required as described below.

Optimization Phase (Multiple Index)

The optimization phase can be divided into the following steps:
1. Generating a set of Monte Carlo paths for the indices using randomized initial conditions;
2. Maximizing the option value on the index/constant growth boundary parameters for each index separately;
3. Combining the index/constant growth boundary parameters found in step 2;
4. Maximizing the option value on the index boundary parameters;
5. Maximizing the option value on the index/constant growth slope parameters for all indices together;
6. Maximizing the option value on the index/constant growth boundary and slope parameters for all indices together;
7. Generating a new set of Monte Carlo paths for the indices using randomized initial conditions;
8. Maximizing the option value on all the parameters at once; and
9. Generating a new set of Monte Carlo paths for the indices with finer time resolution, this time with a constant initial condition.

Option Valuation Phase (Multiple Index)

In the option valuation phase, the current values of the state variable X and the indices $S^i$ are used as starting values for the Monte Carlo paths. The index linkage strategy functions $q^i(S,X,t)$ using the parameters obtained in step 8 of the optimization phase are used to determine index linkage for each path and hence the value $X_T$ for each path. The discounted expected value of $X_T$ is then the option value. Perturbed $X_T$ values calculated using perturbed values for r, X, $S^i$, and $\sigma^i$ are used to calculate the hedging parameters ("Greeks") as described below.

Comments on Key Algorithms Used (Single Index)

Binary Search

A variant of Knuth's Uniform Binary Search, modified for unsuccessful searches and precomputation of array strides, is used to bracket the index value S during the option valuation phase. It is obvious that other search methods (linear, trie, etc.) could be used instead. The original algorithm is given in *The Art of Computer Programming, Volume 3, Sorting and Searching*, Donald E. Knuth.

Lattice Option Valuation Technique

The lattice method, in which up-moves and down-moves on the index recombine, was originally developed in *Option Pricing: A Simplified Approach* (John Cox, Stephen Ross, and Mark Rubinstein, Journal of Financial Economics, September 1979) as an intuitively-graspable discrete time version of the Black-Scholes valuation method. The Black-Scholes method relied on finding an analytic solution to the partial differential equation (PDE) known as the heat equation: the lattice method converges to the Black-Scholes solution as the timestep goes to zero.

A good treatment of the lattice method for European and American calls is given in *Options, Futures, and Other Derivative Securities* (John Hull). The method used here for customized indexed call options is an extension to use dynamic programming to incorporate the optimal strategy function q(S,X,t) and the state variable X.

Dynic Programming

The development of the mathematical technique of dynamic programming is usually credited to Richard Bellman, although its roots go back to the Hamilton-Jacobi equation and Principle of Least Action in physics.

The technique provides an efficient solution procedure for optimization problems with a Markovian structure satisfying Bellman's Principle of Optimality. It is hard to improve on Bellman's own description as given in Section 3.8 of *Adaptive Optimal Control*:

A sequence of allowable decisions, $\{q_1, q_2, \ldots, q_N\}$ will be called a policy; specifically, an N-stage policy. A policy which yields the maximum value of the criterion function, that is to say a policy which produces $f_N(p_1)$, will be called an optimal policy.

Let us suppose that we are dealing with decision processes possessing the Markovian property described above. In this case, the basic property of optimal policies is expressed by the following:

PRINCIPLE OF OPTIMALITY. An optimal policy has the property that whatever the initial state and initial decision are, the remaining decisions must constitute an optimal policy with regard to the state resulting from the first decision.

This gives us a way to solve the problem by working backwards from the last decision to the first.

In the continuous-time case the problem is known as "solution of the Hamilton-Jacobi-Bellman equation". One way to solve this is using the well-known method of lines for partial differential equations together with a parameter minimization procedure. The solution function is continuous in t and X but may not be differentiable in t and X, so that solution procedures assuming differentiability are not appropriate.

A good tutorial description of discrete-time deterministic dynamic programming is given in Chapter 7 of *Introduction to Operations Research*, Frederick S. Hillier and Gerald J. Lieberman.

A complete and concise treatment of discrete-time stochastic dynamic programming is given in *Introduction to Stochastic Dynamic Programming*, Sheldon M. Ross.

A good description of the continuous-time stochastic case (solution of the Hamilton-Jacobi-Bellman) is given in Chapter XI of *Stochastic Differential Equations*, Bernt Øksendal.

Richardson Extrapolation

Richardson extrapolation is a method for increasing the accuracy of numerical estimates depending on a discretization parameter h. It is described in detail in section 7.2.2 of *Numerical Methods*, Germund Dahlquist and Åke Björck.

The best-known example of the use of Richardson extrapolation to improve accuracy is the numerical integration method known as Romberg integration. The general method is to construct a set of estimates for a number of decreasing values of the discretization parameter, e.g. h, h/2, h/4, etc. and then extrapolate to the limiting value that would be obtained in the case h→0.

Richardson extrapolation is used in this program to develop a more accurate option value given option values calculated using two different spacings on the X (state variable) value.

Quadratic Stencil Interpolation

Although linear interpolation during the solution of the Bellman equation is simple to program, the vector spacing required to give reasonable accuracy (i.e. four significant figures) leads to large RAM requirements. Since quadratic interpolation is generally more accurate than linear interpolation, it might be expected that accuracy could easily be improved merely by substituting a quadratic interpolation routine for a linear one.

However, the actual situation is more complex. As mentioned above, the solution to the Bellman equation is continuous in X and t but fails to be differentiable at the boundary between the region in which the constant growth rate is the optimal choice and the region in which the index is the optimal choice. The derivative at the boundary does not exist and so neither does the second derivative.

Blindly applying quadratic interpolation (which depends on the existence of these derivatives) across the boundary can therefore be disastrous, leading to option values that are wrong by multiple orders of magnitude. The fact that the boundary is defined by the solution that is sought makes the problem more difficult.

The approach adopted in the program is to use quadratic stencil interpolation, which interpolates based on the locally-smoothest solution, i.e. picks the points between which to interpolate based on which set gives the smallest absolute value of the highest-order difference. This method has been found to be useful in computational fluid dynamics for the modelling of shock fronts.

Essentially nonoscillatory interpolation (of which quadratic stencil interpolation is a special case) is described in detail in *High-Order Essentially Nonoscillatory Schemes For Hamilton-Jacobi Equations*, Stanley Osher and Chi-Wang Shu.

Comments on Key Algorithms Used (Multiple Index)

Nelder and Mead Nonlinear Optimization Method

The method is suitable for finding minima or maxima of multivariate functions as described in *A simplex method for function minimization*, J. A. Nelder and R. Mead.

The method used in the program is modified to allow a subset of parameters to participate in the optimization with the rest remaining frozen at their existing value, and to add a small amount of random noise to function values to reduce the likelihood of cycling behavior during function minimization.

Choleski Square-Root Decomposition

The method finds a lower triangular factor L of a positive definite symmetric matrix A such that LL'=A, where ' denotes matrix transpose, as described in *Matrix Computations*, Golub and Van Loan.

Calculation of Hedging Parameters ("the Greeks")

In order to hedge an option effectively it is necessary to be able to calculate the option value and some of the partial derivatives of the option value with respect to changes in the financial parameters. These partial derivatives are called the hedging parameters, or less formally "the Greeks".

Key greeks for typical options include $delta^i$, the partial derivative of the option value V with respect to changes in the index $S^i$, rho, the partial derivative of the option value V with respect to changes in the interest rate r, and $vega^i$, the partial derivative of the option value V with respect to changes in the volatility $\sigma^i$.

For the customized indexed call option the partial derivative of V with respect to the state variable X is also important, as it enters the delta calculation if linkage to an index is currently in effect.

The critical observation in calculating the Greeks for the customized indexed call option comes from applying the multivariate chain rule of calculus to the partial derivatives of the option value. The multivariate chain rule can be found in standard sources such as *Advanced Calculus*, Watson Fulks.

We distinguish the cases where the option holder has selected index linkage ("in") vs. constant growth linkage ("out"). If $V(X,S,\sigma,r)$ is the option value assuming optimal control in the future, and P is the participation rate as described above, then the equations for the key Greeks become, where i is an integer between 1 and K, the number of indices:

$Delta^i(Out): \partial V/\partial S^i$ $Delta^i(In): \partial V/\partial S^i + \partial V/\partial X * \partial X/\partial S^i = \partial V/\partial S^i + P^i * \partial V/\partial X$ (for X>0)

$Vega^i(Out): \partial V/\partial \sigma^i$ $Vega^i(In): \partial V/\partial \sigma^i + \partial V/\partial X * \partial X/\partial \sigma^i = \partial V/\partial \sigma^i$, since $\partial X/\partial \sigma^i = 0$.

$Rho(Out): \partial V/\partial r$ $Rho(In): \partial V/\partial r + \partial V/\partial X * \partial X/\partial r = \partial V/\partial r$, since $\partial X/\partial r = 0$.

We then have $Vega^i(In)=Vega^i(Out)$, and $Rho(In)=Rho(Out)$. The only key greek that changes as a result of the option holder's linkage selection is $Delta^i$. Although $Delta^i$ can change discontinuously as the option holder changes their index selection, this can be hedged using futures and still generate reasonable transaction costs.

Comments on CPU Instruction Set Usage (Single Index)

The initialization phase of the program is optimized for use on Intel hardware and will be 2-3 times faster on a Pentium III or later processor in comparison to a Pentium II or earlier processor with equivalent clock speed.

The program detects whether SIMD (Single Instruction Multiple Data) hardware is present and uses it if so to achieve a speedup of a factor of 2-3 during the initialization phase. The speedup comes from the interaction of three optimizations

- Use of packed single-precision floating point operations, allowing "ganged" operations on four single-precision floating point values at a time,
- Forcing of vector lengths to multiples of eight, so that the packed instructions can be unrolled by a factor of two and then scheduled to reduce their latency; and
- Use of prefetch instructions to increase the proportion of the time that required values can be found in the CPU cache when required for calculations rather than having to be fetched from the computer's main random-access memory.

A comprehensive description of the considerations involved in optimizing programs for the Pentium III processor is contained in the Intel Architecture Optimization Reference Manual.

Comments on Memory Allocation (Multiple Index)

Memory allocation is done using a customized 16 Mb allocation block format to increase speed, to avoid memory fragmentation, and to ensure proper alignment on 16-byte boundaries of operands for SIMD instructions. Built-in functions such as GetMem and Dispose could be used at some cost in execution time in the non-SIMD case, but additional programming would be required to achieve proper alignment for SIMD instruction operands.

Typical Method of Operation (Single Index)

Procedure binaryInit Method of Operation

The procedure binaryInit has the following prototype:
procedure binaryInit(n: cardinal; stride: cardinal; pbdeltas: PBDarray);
in which the parameters have the following meanings:
n is the number of entries in the binary search table;
stride is the size in bytes of each entry in the table; and
pbdeltas is a pointer to an array of binary search deltas to be initialized.

The procedure sets the zeroth element of the binary search delta array to the stride and fills in the remainder with the deltas (number of bytes to move up or down in the table) for a binary search on a table of that size.

Procedure binarySearch Method of Operation

The procedure binarySearch has the following prototype:

procedure binarySearch(a0: pointer; bdeltas: PBDarray; key: single; var res: pointer);
in which the parameters have the following meanings:
a0 is a pointer to the zeroth element of the array to be searched;
bdeltas is a pointer to a binary search delta array initialized by binaryInit;
key is the lookup key of the item that is sought; and
res is a pointer to the highest-numbered record in the search array with key value less than or equal to the lookup key, the return value of the procedure.

The procedure starts by comparing the search key with the key of the middle element of the array, and then moves up or down in the array according to the delta sequence to find res as described above.

Procedure qstintvec_nosimd Method of Operation

The procedure qstintvec_nosimd has the following prototype:
procedure qstintvec_nosimd(const gvec: TGridArray;
const pvec: Sarray;
const xivec: Carray; const xcon: Boolean;
const nx: cardinal;
const wa: Sarray;
const yout: Sarray);

in which the parameters have the following meanings
gvec is an array of grid records;
pvec is an array of fractional displacements to use in quadratic stencil interpolation;
xivec is an array of integral displacements to use in quadratic stencil interpolation;
xcon is a Boolean flag, with true indicating that all the elements of pvec are identical and that all the elements of xivec are identical;
nx is the length of the yout array;
wa is a 16-byte-aligned workarea; and yout is an array to be filled in by the procedure with the results of the quadratic stencil interpolation.

If xcon is true then the procedure selects the set of interpolation points with the smaller absolute value of the second difference, calculates the interpolated value from those points, and stores the interpolated value in each element of yout.

If xcon is false then, for each element of xivec and corresponding element of pvec, the procedure selects a set of interpolation points with the smaller absolute value of the second difference, calculates an interpolated value from those points, and stores the interpolated value in the corresponding element of yout.

In each case, the interpolation is performed using an element of gvec. Each element contains a precomputed option value and precomputed first and second difference for the value, as well as a precomputed boolean indicating the smaller absolute value of the second difference. The precomputation is performed by fillgrid_simd or fillgrid_nosimd, depending on the availability of the SIMD instruction set.

Procedure qstintvec_simd method of operation

The procedure qstintvec_simd has the following prototype:
procedure qstintvec_simd(const gvec: TGridArray;
const pvec: Sarray;
const xivec: Carray; const xcon: Boolean;
const nx: cardinal;
const wa: Sarray;
const yout: Sarray);
in which the parameters have the same meanings as for qstintvec_nosimd.

This procedure is functionally equivalent to qstintvec_nosimd but is faster because of its use of the SIMD instruction set.

Procedure bellman_nosimd Method of Operation

The procedure bellman_nosimd has the following prototype:
procedure bellman_nosimd(const v1u, v1d, v2u, v2d, vout: Sarray;
const nx: cardinal; const discp4, discq4: Sarray);

in which the parameters have the following meanings:
v1u is an array of option values assuming constant growth rate linkage is selected and the index makes an up-move;
v1d is an array of option values assuming constant growth rate linkage is selected and the index makes a down-move;
v2u is an array of option values assuming index linkage is selected and the index makes an up-move;
v2d is an array of option values assuming index linkage is selected and the index makes a down-move;
vout is an output array of option values obtained by combining v1u, v1d, v2u, and v2d according to the Bellman recursion;
nx is the common length of the vectors v1u, v1d, v2u, v2d, and vout;
discp4 is a vector of length four in which each element equals the discounted up-move probability; and
discq4 is a vector of length four in which each element equals the discounted down-move probability.

The procedure applies the Bellman recursion described above. The iteration through the vector is unrolled by a factor of four to improve execution speed.

Procedure bellman_simd Method of Operation

The procedure bellman_simd has the following prototype:

procedure bellman_simd(const v1u, v1d, v2u, v2d, vout: Sarray;
const nx: cardinal; const discp4, discq4: Sarray);

in which the parameters have the same meanings as for bellman_nosimd.

This procedure is functionally equivalent to bellman_nosimd but is faster because of its use of the SIMD instruction set.

Procedure fillgrid_nosimd Method of Operation

The procedure fillgrid_nosimd has the following prototype: procedure fillgrid_nosimd(const gvec: TGridArray; const sa: Sarray;
const nx: cardinal);

in which the parameters have the following meanings:
gvec is an array of grid records;
sa is an array of option values; and
nx is the common length of gvec and sa.

The procedure calculates first and second differences of the option values in the array, together with a Boolean flag indicating the relative magnitude of the absolute values of the second differences of the option values and then fills in the grid record fields on the basis of this computation.

Procedure fillgrid_simd Method of Operation

The procedure fillgrid_simd has the following prototype:
procedure fillgrid_simd(const gvec: TGridArray; const sa: Sarray;
const nx: cardinal);

in which the parameters have the same meanings as for fillgrid_nosimd.

This procedure is functionally equivalent to fillgrid_nosimd but is faster because of its use of the SIMD instruction set.

Function makeLattice Method of Operation

The function makeLattice has the following prototype:
function makeLattice(rin, din, sigmain, gin, minpartin, maxpartin: double;
tmaxin, xmaxin, htin, hxin: double): PLattice;

in which the parameters have the following meanings:
rin is the continuously-compounded risk-free rate;
din is the continuously-compounded dividend rate;
sigmain is the index volatility;
gin is the guaranteed rate for constant growth linkage;
minpartin is the minimum participation rate in subsequent calls to value_am;
maxpartin is the maximum participation rate in subsequent calls to value_am;
tmaxin is the maximum time to expiry in subsequent calls to value_am;
xmaxin is the maximum value of X (the state variable) to enter the recursion;
htin is the time spacing used in constructing the lattice of vectors; and
hxin is the spacing on X (the state variable) used in constructing the lattice of vectors.

Typical call parameters are init_am(0.06, 0.008, 0.3, 0.05, 0.4, 1.2, 5, 10, 0.1, 0.02). If either ht or hx is too large, then the values returned by value_am in later calls will not be sufficiently accurate: if ht and hx are too small, then RAM usage and initialization time may become excessive.

The function creates a lattice of vectors based on the specified input values and returns a pointer to it. The computation proceeds in 7 stages:

Stage 1—computation of index up-move and down-move sizes and their corresponding risk-neutral probabilities, Stage 2—calculation of option payoff boundary values on coarse and fine X vectors, together with their first and second differences, Stage 3—partial allocation of the lattice of vectors, Stage 4—copying of boundary conditions from grids to lattice of vectors, Stage 5—precomputation of partial and integral displacements for quadratic stencil interpolation assuming constant growth linkage, Stage 6—precomputation of partial and integral displacements for quadratic stencil interpolation assuming index linkage, Stage 7—application of the Bellman recursion recursively backwards, using SIMD-specific procedures if the SIMD instruction set is available, on coarse and fine vectors, copying Richardson-extrapolated value to the lattice of vectors.

Function getValueAtEpoch Method of Operation

The function getValueAtEpoch has the following prototype:
function getValueAtEpoch(s: double; x: double; const lat: PLattice;
const ep: PEpoch): double;

in which the parameters have the following meanings:
s is the current value of the index;
x is the value of the state variable;
lat is a pointer to a lattice of vectors; and
ep is a pointer to an epoch record (a vector of lattice nodes all with the same time to expiry).

The function calls binarySearch to find two lattice nodes with index values bracketing s, linearly interpolates option values on x for each of the nodes, and then linearly interpolates those interpolated values on s to get an option value.

Function getvalue Method of Operation

The function getvalue has the following prototype:
function getvalue(const s: double; const x: double; t: double;
const lat: PLattice): double;

in which the parameters have the following meanings:
s is the current value of the index;
x is the value of the state variable;
t is the time to expiry of the option; and
lat is a pointer to a lattice of vectors.

The function finds two epochs bracketing t, calculates $rt=\sqrt{t}$, calls getValueAtEpoch for each of the epochs, and then linearly interpolates those results on rt.

Function simd Method of Operation

The function simd has the following prototype:
function simd(dummy: integer): integer; stdcall;

in which the dummy parameter is not used but is included to facilitate calling linkage. The function returns the value 1 if the CPU supports the SIMD instruction set and 0 if it does not or if force_no_simd has been called.

Function force_no_simd Method of Operation

The function force_no_simd has the following prototype:
function force_no_simd(dummy: integer): integer; stdcall;

in which the dummy parameter is not used but is included to facilitate calling linkage. The function always returns 0. After this function has been called the SIMD instruction set will not be used even if it is available. The purpose of the function is to force consistent computation (including rounding errors) on different CPU models if this is necessary to debug a calling application.

Procedure init_am Method of Operation
The procedure init_am has the following prototype:
procedure init_am(r, d, sigma, g, minpart, maxpart: double;
tmax, xmax, ht, hx: double); stdcall;

in which the parameters have the following meanings:
r is the continuously-compounded risk-free rate;
d is the continuously-compounded dividend rate;
sigma is the index volatility;
g is the guaranteed rate for constant growth linkage;
minpart is the minimum participation rate in subsequent calls to value_am;
maxpart is the maximum participation rate in subsequent calls to value_am;
tmax is the maximum time to expiry in subsequent calls to value_am;
xmax is the maximum value of X (the state variable) to enter the recursion;
ht is the time spacing used in constructing a lattice of vectors; and
hx is the spacing on X (the state variable) used in constructing a lattice of vectors.

The procedure:
calls makeLattice with unmodified input assumptions to create a base lattice to be used in calculating the value V of the option,
calls makeLattice with interest rates perturbed up and down by ½% to create lattices to be used in calculating rho ($\partial V/\partial r$) for the option, and
calls makeLattice with volatilities perturbed up and down by ½% to create lattices to be used in calculating vega ($\partial V/\partial \sigma$) for the option.

Procedure value_am Method of operation
The procedure value_am has the following prototype:
procedure value_am(s, x, t, part: double;
pVal, pDvds, pDollar, pRho, pVega: PDouble
); stdcall;

in which the parameters have the following meanings:
s is the value of the index;
x is the value of the state variable;
t is the remaining time until expiry of the option;
part is the participation rate for the option;
pVal is a pointer to the output location in which the value of the option will be stored;
pDvds is a pointer to the output location in which $\partial V/\partial S$ for the option will be stored;
pDollar is a pointer to the output location in which $\partial V/\partial X$ for the option will be stored;
pRho is a pointer to the output location in which $\partial V/\partial r$ for the option will be stored; and
pVega is a pointer to the output location in which $\partial V/\partial \sigma$ for the option will be stored.

The procedure calculates the option value V using the base lattice created by procedure init_am and stores it in the location referenced by pVal.

The procedure then calculates $\partial V/\partial S$ using a Savitzky-Golay smoothing filter and seven option values calculated on the base lattice at evenly-spaced intervals of S. Although a simple finite-difference approximation could be used instead of the Savitzky-Golay smoothing filter, the results would be less accurate.

A value for $\partial V/\partial X$ is then calculated using a Savitzky-Golay smoothing filter and seven option values calculated on the base lattice at evenly-spaced intervals of X. Rho and vega are then calculated using the perturbed lattices created by procedure init_am and a centred finite-difference approximation.

Typical Method of Operation (Multiple Index)

Function marNorm Method of Operation
The function marNorm has the following prototype:
function marNorm: double;
The function uses the Marsaglia-Bray algorithm (as described in *Stochastic Simulation*, Brian D. Ripley) to generate pseudo-random numbers from a standard normal distribution.

Procedure Choleski Method of Operation
The procedure choleski has the following prototype:
procedure choleski(a: Sarray; nv: integer);

in which the parameters have the following meanings:
a is the zero-origin single-precision square matrix for which the Choleski square-root decomposition is to be found; and
nv is the number of rows in the matrix: since the matrix is square, this is also the number of columns.

The standard Choleski algorithm (as described in *Matrix Computations*, Gene H. Golub and Charles F. Van Loan, where it is called the gaxpy Choleski algorithm) is used. The input matrix is assumed to be positive definite symmetric. If this is not the case, then a numeric exception is raised in the procedure when it attempts to evaluate the square root of a negative number. The input matrix is overwritten with its Choleski square root.

Function Piainit Method of Operation
The function piainit has the following prototype:
function piainit(tolvalin: single;
nindexin, nsimin, nstepsin: integer;
si: Sarray;
t, r: single;
part: Sarray;
g: single;
d, sig: Sarray;
corr: Sarray;
doGreeks: Boolean;
diffuse: Boolean
): PPiaRec;

in which the parameters have the following meanings:
tolvalin is the tolerance value for optimization comparisons, usually on the order of $10^{-3}$ or $10^{-4}$;
nindexin is the number of indices from which the option holder can select index linkage;
nsimin is the number of simulations (Monte Carlo paths) to initialize for, usually on the order of 10,000 to 100,000;
nstepsin is the number of time steps into which to divide the simulation runs, usually on the order of 10 to 50;
si is the vector of initial values for each of the indices, usually taken to be all ones;
t is the maximum length of time in years for which option values will be calculated, usually on the order of 5 to 7 years;
r is the continuously-compounded risk-free interest rate to be used in Monte Carlo path generation;
part is the vector of participation rates to be applied to the changes in each of the indices;
g is the continuous compounding rate to apply when the option holder selects the constant growth alternative;
d is the continuously-compounded dividend rate to be used in Monte Carlo path generation;
sig is the vector of volatilities to use in Monte Carlo path generation;

corr is the vector of correlations to use in Monte Carlo path generation;

doGreeks is a Boolean flag indicating whether perturbed Monte Carlo paths should be generated for purposes of calculating Greeks. This flag is false during the optimization phase of the program; and diffuse is a Boolean flag indicating whether a diffuse initial condition should be used to explore the control boundaries for the option more fully. This flag is true during the optimization phase of the program.

The function constructs a record containing a set of correlated Monte Carlo paths and returns a pointer to the record as its result. The steps performed by the function are as follows:

Generate a grid of option values, for each index separately, based on the remaining time to option expiry and the volatility for the index, to be used to drive the control boundary decision between that particular index and the constant growth alternative;

Calculate the covariance matrix for the indices from the index volatilities and correlations and compute its Choleski square root so that the set of correlated lognormal index paths can be built up from uncorrelated normal variates (this use of the Choleski square root is described in, for example, *Probability and Statistics*, D. A. S. Fraser);

Calculate additional Choleski square roots of covariance matrices with perturbed index volatilities for possible use in vega calculations (see next step); and Generate the base set of correlated lognormal index paths from either a sharp (all index paths start at the input si value) or diffuse (index paths start at a randomly-perturbed si value). If doGreeks is true, then also generate additional sets of correlated lognormal index paths based on perturbed values of r, the interest rate, for rho calculations, perturbed values of si, the initial index value, for delta calculations, and perturbed values of sig, the index volatility, for vega calculations.

Function Piasim Method of Operation
The function piasim has the following prototype:
function piasim(prec: PPiaRec;
ef: Sarray): single;

in which the parameters have the following meanings:
prec is a pointer to the record containing pointers to the Monte Carlo paths and related items; and
ef is a single-precision vector of parameters for optimal control of the option, i.e. controlling the option-holder's choice among the indices available and between the indices and the constant growth option.

The function returns the value of the option for the Monte Carlo paths and parameters contained in the record pointed to by prec. A simple "greedy" method is used, i.e. at each timestep the index with the highest estimated value is selected from the set of indices within the current control boundaries. This method is valid to the extent that the problem can be approximated as a "bandit problem" (see *Introduction to Stochastic Dynamic Programming*, Sheldon Ross), and this will be true for economically reasonable values of interest rates, volatilities and dividend rates and in the limiting case in which the timestep approaches zero.

Function Piasim_Greeks Method of Operation
The function piasim_greeks has the following prototype:
procedure piasim_greeks(prec: PPiaRec;
ef: Sarray;
xin: single;
siin: Sarray;
term: single;
valgr: Sarray);

in which the parameters have the following meanings:
prec is a pointer to the record containing pointers to the Monte Carlo paths and related items;
ef is a single-precision vector of parameters for optimal control of the option, i.e. controlling the option-holder's choice among the indices available and between the indices and the constant growth option;
xin is the current value of the state variable X;
siin is a vector of the current index value for each of the indices;
term is the remaining term of the option in years; and
valgr is an output vector returning, in order, the value V of the option, the rho ($\partial V/\partial r$) of the option, $\partial V/\partial X$ for the option, delta ($\partial V/\partial S^i$) for each index for the option, and vega ($\partial V/\partial \sigma^i$) for each index for the option.

The function returns, in valgr, the value of the option for the Monte Carlo paths and parameters contained in the record pointed to by prec.

The same "greedy" method is used as for piasim. In addition to the unperturbed index scenarios (which are used to drive the optimal control choices for the option), scenarios with perturbed values of siin, r, X, and sig are also generated so that the greeks can be calculated.

Procedure Piafree Method of Operation
The procedure piafree has the following prototype:
procedure piafree(prec: PPiaRec);

in which prec is a pointer to the record containing pointers to the Monte Carlo paths and related items. The procedure frees all the storage areas for which the record pointed to by prec contains pointers, and then frees the record itself.

Function NegPiaVal Method of Operation
The function NegPiaVal has the following prototype:
function NegPiaVal(prec: PPiaRec; parms: Sarray): single;

in which the parameters have the following meanings:
prec is a pointer to the record containing pointers to the Monte Carlo paths and related items; and
parms is a single-precision vector of active parameters for optimal control of the option, i.e. the subset of parameters currently active in the optimization controlling the option-holder's choice among the indices available and between the indices and the constant growth option.

The function expands the active parameters in parms into the fill set, and then returns the negative of the value of piasim given those parameters. The value is modified by a small amount of random noise to limit the cycling behavior that might otherwise occur for relatively small sample sizes and tolerances.

Function NelderMeadMaxPiaVal Method of Operation
The function NelderMeadMaxPiaVal has the following prototype:
function NelderMeadMaxPiaVal(prec: PPiaRec;
parmsin: Sarray; scale: Sarray;
maxcalls: cardinal; parmsout: Sarray): single;

in which the parameters have the following meanings:
prec is a pointer to the record containing pointers to the Monte Carlo paths and related items;
parmsin is a single-precision input vector of initial parameter estimates for optimal control of the option, i.e. controlling the option-holder's choice among the indices available and between the indices and the constant growth option;

scale controls the amount by which each of parmsin is modified for purposes of constructing the initial simplex, with a scale of zero signalling that the corresponding value of parmsin is not currently active in the optimization;

maxcalls is the maximum number of function calls permitted in the optimization; and parmsout is a single-precision output vector of improved parameters for optimal control of the option.

The function returns the maximum option value found using the Nelder-Mead optimization method (as described in *A simplex method for function minimization*, J. A. Nelder and R. Mead).

Function init_cio Method of Operation
The function init_cio has the following prototype:
function init_cio(nindicesin: integer;
siin, partin, din, sigin, corrin: Darray;
maxtin, rin, gin: double;
nsimin: integer): integer; stdcall;

in which the parameters have the following meanings:
nindicesin is the number of indices from which the option-holder can select;
siin is the address of the vector of initial values for the indices;
partin is the address of the vector of the participation rates associated with each index;
din is the address of the vector of the continuously-compounded dividend rates for each index;
sigin is the address of the vector of volatilities for each index;
corrin is the address of the correlation matrix for the indices;
maxtin is the maximum remaining option term that will ever be used in a call to value_cio;
rin is the continuously-compounded risk-free rate;
gin is the continuously-compounded constant growth rate; and
nsimin is the number of Monte Carlo path simulations to generate for later use by value_cio: 20,000 would be a typical value for this parameter.

The vectors siin, partin, din, and sigin each have nindicesin elements, numbered starting at zero. The correlation matrix corrin has nindicesin$^2$ elements. The function returns a pointer to the last record created by piainit, type-cast to an integer for use in calling environments that do not support the direct use of pointers (such as APL and Excel).

The steps performed by the function are as follows:
Generate a set of Monte Carlo paths for the indices using randomized initial conditions;
Maximize the option value on the index/constant growth boundary parameters for each index separately;
Combine the index/constant growth boundary parameters found in step 2;
Maximize the option value on the index boundary parameters;
Maximize the option value on the index/constant growth slope parameters for all indices together;
Maximize the option value on the index/constant growth boundary and slope parameters for all indices together;
Generate a new set of Monte Carlo paths for the indices using randomized initial conditions;
Maximize the option value on all the parameters at once; and
Generate a new set of Monte Carlo paths for the indices with finer time resolution, this time with a constant initial condition.

Procedure value_cio Method of Operation
The procedure value_cio has the following prototype:
procedure value_cio(locp: integer;
sun: Darray;
xin: Double;
termin: Double;
aout: Darray); stdcall;

in which the parameters have the following meanings:
locp is the address of the record (coerced to integer) containing the Monte Carlo paths and optimal control parameters for the option;
siin is the address of the vector of the (double-precision) current values for the indices;
xin is the current value of the state variable X associated with the option;
termin is the remaining term for the option in years; and aout is the address of the double precision vector, allocated by the caller, to hold the value of the option and the greeks for it. The value and greeks are in the same order as described above for valgr in the procedure piasim_greeks.

The procedure calls piasim_greeks using the saved set of maximizing parameters to obtain the value and greeks for the option, based on the values of siin, xin, and termin, and copies these results to aout.

Procedure free_cio Method of Operation
The procedure free_cio has the following prototype: procedure free_cio(locp: integer); stdcall;

in which the parameter locp is the address of the record (coerced to integer) containing the Monte Carlo paths and optimal control parameters for the option.

The procedure calls piafree to free the storage associated with locp. After calling free_cio, it is unsafe to call value_cio again with the same value of locp: init_cio must be called to obtain a fresh value of locp.

What is claimed is:

1. A computer-based method for determining a value of a customized indexed call option, comprising:
   a) selecting, using a processor in at least one specially programmed computer, a range from the group consisting of a range between a first lattice node with an index value no greater than an index value for said customized indexed call option and a second lattice node with an index value at least equal to said index value for said customized indexed call option, and a range between a first epoch with a time no greater than a time to expiry for said customized indexed call option and a second epoch with a time at least equal to said time to expiry, wherein the first lattice node, the second lattice node, the first epoch, and the second epoch are stored in a memory element for the at least one computer;
   b) searching, using the processor, a lattice data structure, stored in the memory element, by applying said range from said group to said lattice data structure to identify at least one value in the lattice data structure included in said range, the at least one value comprising at least one intermediate value of said customized indexed call option;
   c) interpolating, using the processor, in said at least one intermediate value of said customized indexed call option based on a set of predetermined parameters of the customized indexed call option, stored in the memory element, to find said value; and,
   d) presenting, on a graphical user interface for the at least one computer, an option for a holder of the customized indexed call option to switch between said index and said constant growth rate at predefined intervals during a term for said customized indexed call option, wherein said customized indexed call option comprises a term and an index linkage to an index and a constant growth rate.

2. A computer-based method for determining a value of a customized indexed call option as recited in claim 1 wherein said search criterion comprises a set of predetermined parameters of the customized indexed call option.

3. A computer-based method for determining a value of a customized indexed call option as recited in claim 1 wherein said data structure is initialized based on a second predetermined set of parameters.

4. An apparatus for determining a value of a customized indexed call option, comprising:
   a) means for selecting a range, the means for selecting including a processor in at least one specially programmed computer, from the group consisting of a range between a first lattice node with an index value no greater than an index value for said customized indexed call option and a second lattice node with an index value at least equal to said index value for said customized indexed call option, and a range between a first epoch with a time no greater than a time to expiry for said customized indexed call option and a second epoch with a time at least equal to said time to expiry wherein the first lattice node, the second lattice node, the first epoch, and the second epoch are stored in a memory element for the at least one computer;
   b) means for searching, the means for searching including the processor, a lattice data structure, stored in the memory element, by applying said range from said group to said lattice data structure to identify at least one value in the lattice data structure included in said range, the at least one value comprising at least one intermediate value of said customized indexed call option;
   c) means for interpolating, the means for interpolating including the processor, in said at least one intermediate value of said customized indexed call option based on a set of predetermined parameters of the customized indexed call option to find said value; and,
   d) means for presenting, on a graphical user interface for the at least one computer, an option for a holder of the customized indexed call option to switch between said index and said constant growth rate at predefined intervals during a term for said customized indexed call option, wherein said customized indexed call option comprises a term and an index linkage to an index and a constant growth rate.

5. The apparatus recited in claim 4 wherein said means for searching a data structure comprises a general purpose computer specially programmed to search said data structure based on said search criterion to determine at least one intermediate value of said customized indexed call option.

6. The apparatus recited in claim 4 wherein said means for interpolating in said at least one intermediate value of said customized indexed call option comprises a general purpose computer specially programmed to perform said interpolation.

7. An apparatus for determining a value of a customized indexed call option, comprising:
   a) means for generating, the means for generating including a processor in at least one specially programmed computer, a first sample of index paths based on a first set of predetermined parameters;
   b) means for determining an optimal choice boundary maximizing an intermediate value of said customized indexed call option for such first sample of index paths, the means for determining an optimal choice boundary including the processor;
   c) means for determining said value of said customized indexed call option from said determined optimal choice boundary and a second sample of index paths and a second set of predetermined parameters, the means for determining said value including the processor; and,
   d) means for presenting, on a graphical user interface for the at least one computer, an option for a holder of the customized indexed call option to switch between said index and said constant growth rate at predefined intervals during a term for said customized indexed call option, wherein said customized indexed call option comprises a term and an index linkage to an index and a constant growth rate.

8. The apparatus recited in claim 7 wherein said means for generating a first sample of index paths based on a first set of predetermined parameters comprises a general purpose computer specially programmed to generate said first sample of index paths.

9. The apparatus recited in claim 7 wherein said means for determining an optimal choice boundary maximizing an intermediate value of said customized indexed call option for such first sample of index paths comprises a specially programmed general purpose computer.

10. The apparatus recited in claim 7 wherein said means for determining said value of said customized indexed call option from said determined optimal choice boundary and a second sample of index paths and a second set of predetermined parameters comprises a specially programmed general purpose computer.

* * * * *